(12) United States Patent
Cho et al.

(10) Patent No.: US 12,739,762 B2
(45) Date of Patent: Sep. 15, 2026

(54) RADIO LINK MONITORING AND RECEPTION POWER FOR A CARRIER WITHOUT AN SSB IN INTER-BAND CARRIER AGGREGATION

(71) Applicant: QUALCOMM Incorporated, San Diego, CA (US)

(72) Inventors: Hyunwoo Cho, San Diego, CA (US); Changhwan Park, San Diego, CA (US); Carlos Cabrera Mercader, Cardiff, CA (US); Heechoon Lee, San Diego, CA (US); Jae Ho Ryu, San Diego, CA (US); Yongle Wu, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 18/415,480

(22) Filed: Jan. 17, 2024

(65) Prior Publication Data

US 2024/0340820 A1 Oct. 10, 2024

Related U.S. Application Data

(60) Provisional application No. 63/495,230, filed on Apr. 10, 2023.

(51) Int. Cl.

| | |
|---|---|
| ***H04W 56/00*** | (2009.01) |
| ***H04B 7/06*** | (2006.01) |
| ***H04L 5/00*** | (2006.01) |
| ***H04W 52/52*** | (2009.01) |

(52) U.S. Cl.
CPC ...... *H04W 56/0015* (2013.01); *H04B 7/0626* (2013.01); *H04L 5/0051* (2013.01); *H04W 52/52* (2013.01)

(58) Field of Classification Search
CPC ..... H04L 5/0048; H04L 5/005; H04L 5/0051; H04J 11/0069; H04J 11/0073; H04J 11/0076; H04J 11/0079; H04J 11/0083; H04J 11/0093; H04J 11/0096; H04J 3/0638
See application file for complete search history.

(56) References Cited

U.S. PATENT DOCUMENTS

| | | | | |
|---|---|---|---|---|
| 2024/0214174 A1* | 6/2024 | He | .................... | H04W 52/0235 |
| 2024/0251354 A1* | 7/2024 | Shin | .................. | H04W 52/0251 |
| 2024/0259064 A1* | 8/2024 | Park | ...................... | H04L 5/0023 |

* cited by examiner

*Primary Examiner* — Bo Hui A Zhu
(74) *Attorney, Agent, or Firm* — Procopio, Cory, Hargreaves & Savitch LLP

(57) ABSTRACT

Apparatus, methods, and computer program products for wireless communication are provided. An example method may include receiving, from a network entity, a configuration indicative of a transmit power difference between a special cell in a first frequency band and a secondary cell without an SSB in a second frequency band. The example method may further include determining, based on a condition of an absence of a synchronization signal configuration for the secondary cell, a power of a signal associated with the secondary cell based on the transmit power difference and a measured power associated with the special cell. The example method may further include communicating, with the network entity, via the secondary cell and based on the power determined for the signal associated with the secondary cell.

28 Claims, 10 Drawing Sheets

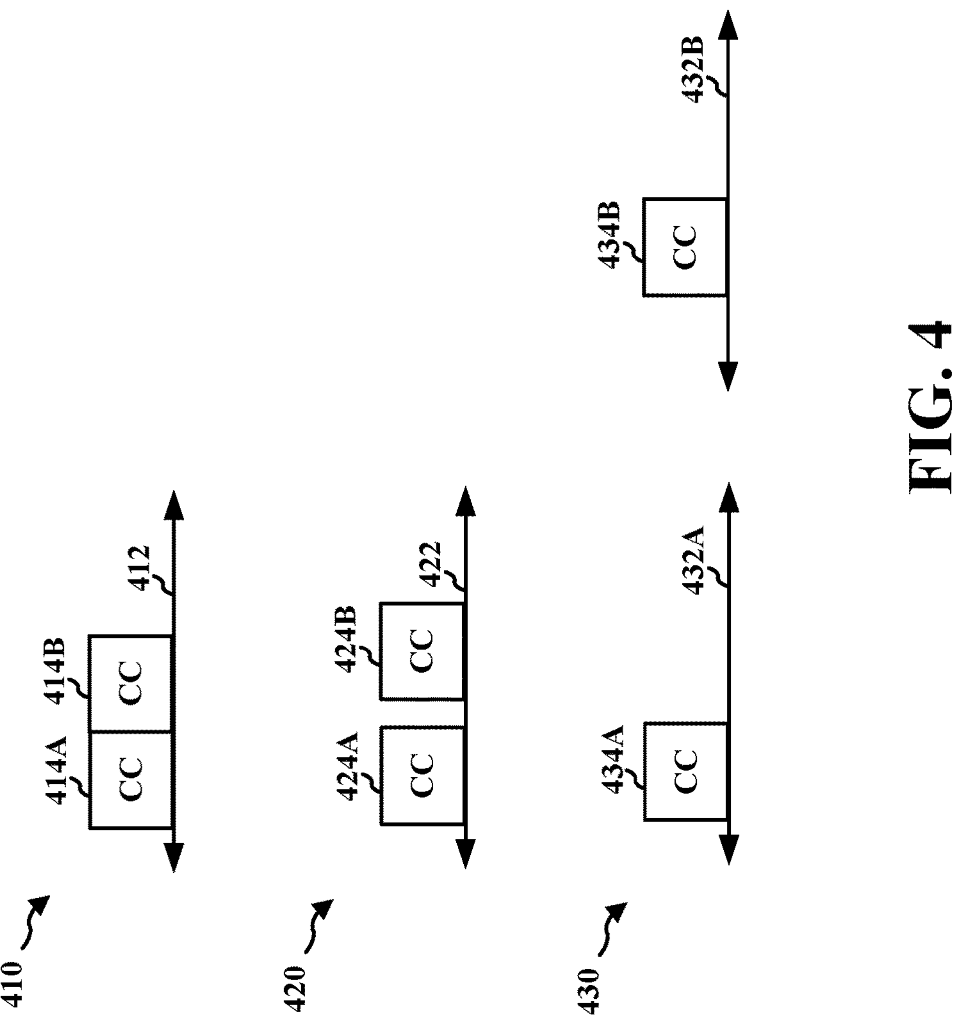
FIG. 4
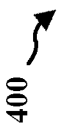

500

600
PCell 604
To-be-activated Scell 606
UE 602
MAC CE for Scell activation 610
ACK 612
MAC CE decoding (3ms) 614
$T_{HARQ}$
$T_{firstSSB}$
Fine T/F
(2ms)
$T_{CSI\text{-}Reporting}$
Valid CSI report 620
SSB on to-be-activated Scell 650
PCell 654
To-be-activated Scell 656
UE 652
MAC CE for Scell activation 660
ACK 662
MAC CE decoding (3ms) 664
$T_{HARQ}$
$T_{CSI\text{-}Reporting}$
Valid CSI report 670
TRS on to-be-activated Scell

RADIO LINK MONITORING AND RECEPTION POWER FOR A CARRIER WITHOUT AN SSB IN INTER-BAND CARRIER AGGREGATION

CROSS REFERENCE TO RELATED APPLICATION(S)

This application claims the benefit of and priority to U.S. Provisional Application Ser. No. 63/495,230, entitled "RADIO LINK MONITORING AND RECEPTION POWER FOR A CARRIER WITHOUT AN SSB IN INTER-BAND CARRIER AGGREGATION" and filed on Apr. 10, 2023, which is expressly incorporated by reference herein in its entirety.

TECHNICAL FIELD

The present disclosure relates generally to communication systems, and more particularly, to wireless communication systems with carrier aggregation (CA).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (cMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on stored information that is stored in the at least one memory, the at least one processor is configured to cause the apparatus to receive, from a network entity, a configuration indicative of a transmit power difference between a special cell in a first frequency band and a secondary cell without an SSB in a second frequency band. Based at least in part on stored information that is stored in the at least one memory, the at least one processor is configured to cause the apparatus to determine, based on a condition of an absence of a synchronization signal configuration for the secondary cell, a power of a signal associated with the secondary cell based on the transmit power difference and a measured power associated with the special cell. Based at least in part on stored information that is stored in the at least one memory, the at least one processor is configured to cause the apparatus to communicate, with the network entity, via the secondary cell and based on the power determined for the signal associated with the secondary cell.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating various types of carrier aggregation, in accordance with various aspects of the present disclosure.

DETAILED DESCRIPTION

Figure 1:
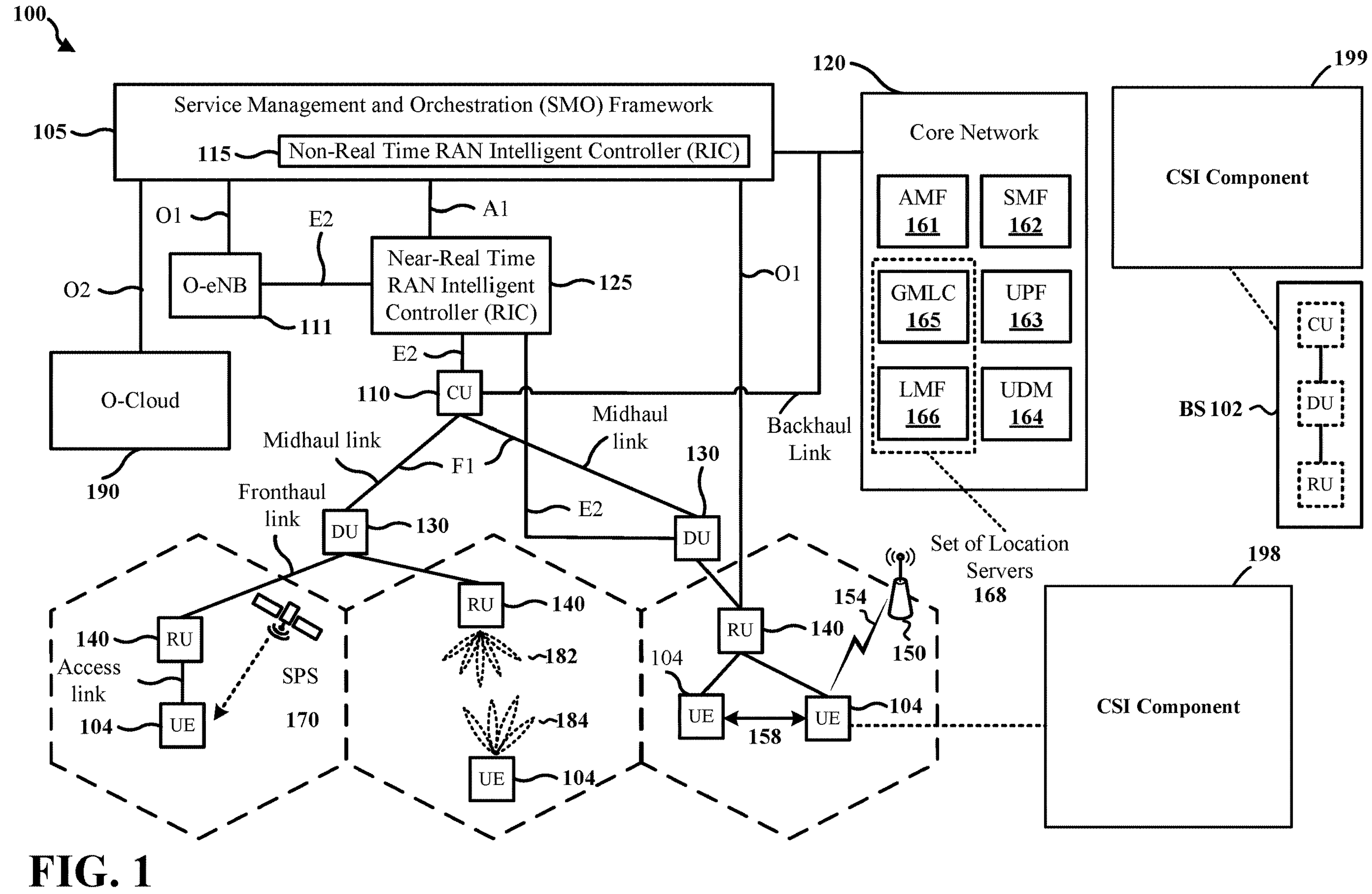
FIG. 1 is a diagram illustrating an example of a wireless communications system and an access network, in accordance with various aspects of the present disclosure.

A UE and a network may communication using multiple carriers, (e.g., which may be referred to as component carriers (CCs) or cells) based on a carrier aggregation (CA) configuration. The carriers may include a primary component carrier and one or more secondary component carriers. A primary component carrier may be referred to as a primary cell (PCell) and a secondary component carrier may be referred to as a secondary cell (SCell). The UE may be configured to communication using a group of secondary cells, which may include a primary secondary cell (PSCell) and other SCells. The PCell and the PSCell may be referred to as special cells (SpCells). An SCell that does not transmit an SSB may be referred to as an SSB-less SCell. For SSB-less SCells associated with non-anchor carrier, when radio link monitoring (RLM) reference signal (RLM-RS) or beam failure detection (BFD) signal (BFD-RS) are not configured, a UE may be unable to perform radio link monitoring or beam failure detection because the UE does not have an SSB to evaluate the downlink radio link quality on the non-anchor carrier. Aspects provided herein may enable a UE to perform beam failure detection or radio link monitoring on SSB-less SCells associated with non-anchor carrier by indicating a transmit power difference between a special cell (SpCell) and SSB-less SCells.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a CA component 198. In some aspects, the CA component 198 may be configured to receive, from a network entity, a configuration indicative of a transmit power difference between a special cell in a first frequency band and a secondary cell without an SSB in a second frequency band. In some aspects, the CA component 198 may be further configured to determine, based on a condition of an absence of a synchronization signal configuration for the secondary cell, a power of a signal associated with the secondary cell based on the transmit power difference and a measured power associated with the special cell. In some aspects, the CA component 198 may be further configured to communicate, with the network entity, via the secondary cell and based on the power determined for the signal associated with the secondary cell.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
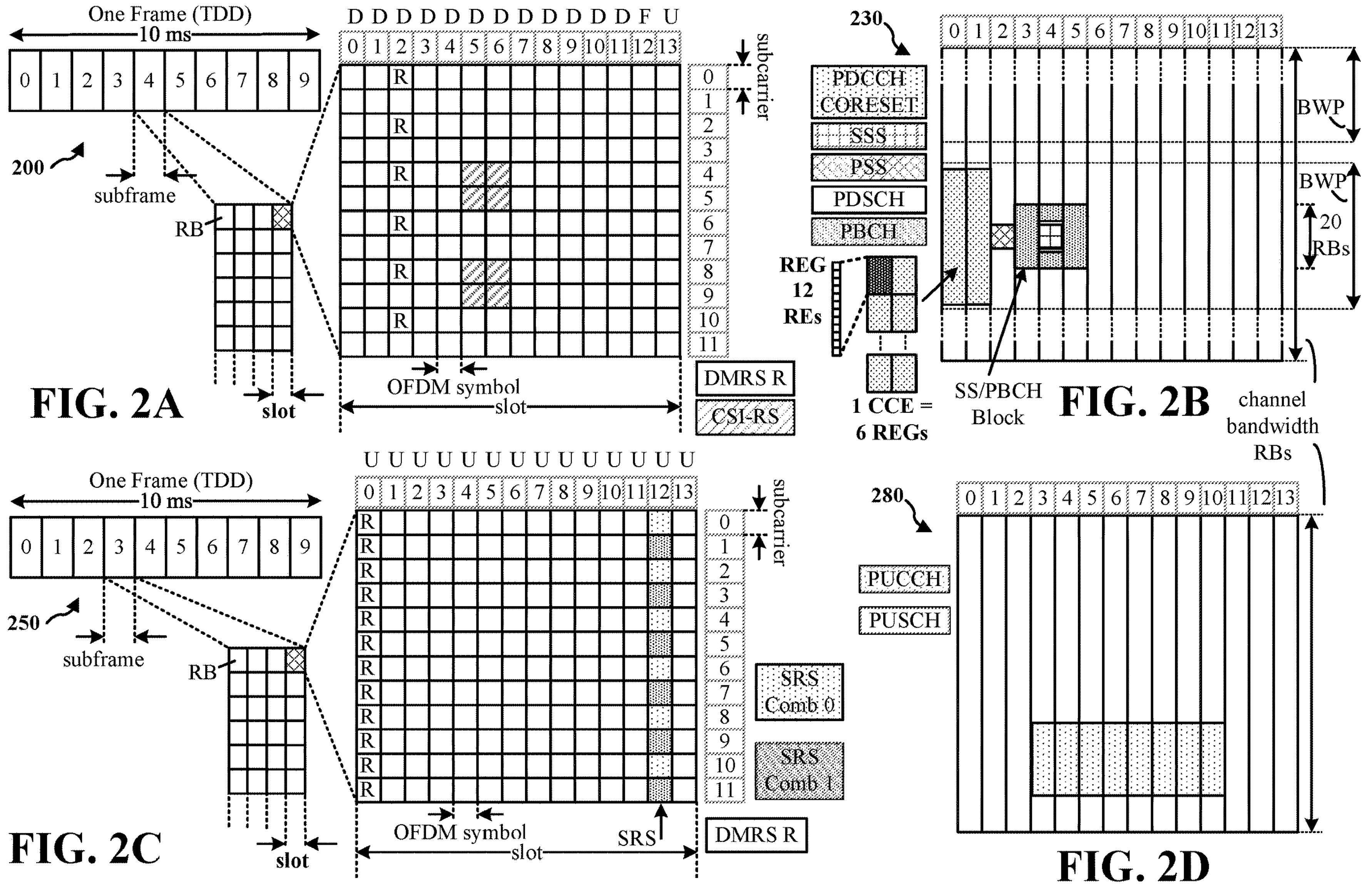
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to 24*15 kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
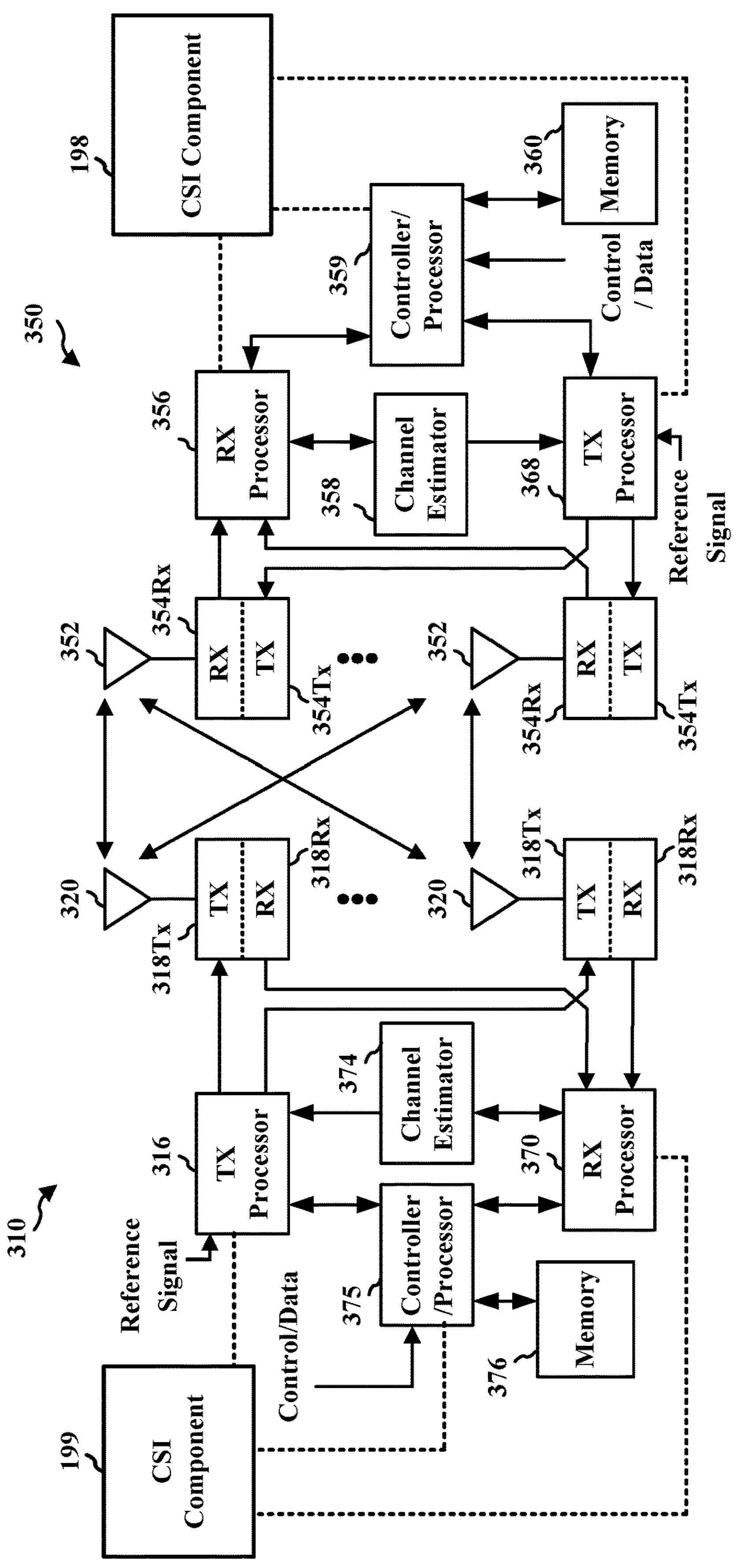
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with CA component 198 of FIG. 1.

At least one of the TX processor 316, the RX processor 370, and the controller/processor 375 may be configured to perform aspects in connection with CA component 199 of FIG. 1.

Carrier aggregation (CA) is a mechanism that aggregates multiple component carriers (CCs), which can be jointly used for transmission to/from a single device. Two or more carriers may be combined into one data channel to enhance the data capacity of a network. Carrier aggregation may enable increased UL and DL data rates. Carrier aggregation may include intra-band aggregation with frequency-contiguous component carriers, intra-band aggregation with non-contiguous component carriers, or inter-band aggregation.

FIG. 4 is a diagram 400 illustrating various types of carrier aggregation. As illustrated in example 410 of FIG. 4, for intra-band aggregation with frequency-contiguous component carriers, in a frequency band 412, two frequency-contiguous component carriers 414A and 414B may be aggregated. As illustrated in example 420 of FIG. 4, for intra-band aggregation with non-contiguous component carriers, in a frequency band 422, two non-contiguous component carriers 424A and 424B may be aggregated. As illustrated in example 430 of FIG. 4, for inter-band aggregation, a component carrier 434A on a first frequency band 432A may be aggregated with a component carrier 434B on a second frequency band 432B.

Inter-band carrier aggregation may be utilized with component carriers with SSB transmissions and component carriers without SSB transmissions. In some aspects, among a group of component carriers to be aggregated, a component carrier with an SSB transmission may be referred to as an "anchor carrier" and a component carrier without an SSB transmission may be referred to as an "SSB-less carrier." In some wireless communication systems, SSB or system information (SI) in one carrier (e.g., the carrier with the SSB transmission) may provide time or frequency (T/F) synchronization information and SI for other carriers (e.g., the carriers without SSB transmissions). Such a configuration may improve secondary cell (SCell) activation latency by facilitating efficient SCell activation/deactivation according to the traffic for network power savings. Such a configuration may also improve resource utilization by downlink overhead reduction. In addition, such a configuration may enable various network energy savings.

In some wireless communication systems, downlink power allocation may be based on a serving cell configuration. The serving cell configuration may include a synchronization signal (SS) PBCH transmit power (such as by including an information element (IE)), which may be represented by an IE ss-PBCH-BlockPower. Based on the SS/PBCH transmit power, a UE may derive a secondary synchronization signal (SSS) energy per RE (EPRE) of a SS/PBCH block. The transmit power for CSI-RS, such as CSI-RS EPRE may be derived from (e.g., computed based on) the SS/PBCH transmit power and a CSI-RS power offset (e.g., represented by an IE powerControlOffsetSS). The transmit power for a PDSCH, such as PDSCH EPRE, may be derived from (e.g., computed based on) the CSI-RS EPRE and a power offset (e.g., represented by IE powerControlOffset) between the PDSCH EPRE and the CSI-RS EPRE. The power offset between the PDSCH EPRE and the CSI-RS EPRE and the CSI-RS power offset may be associated with an IE associated with the CSI resource set (e.g., represented by IE NZP-CSI-RS-Resource). In some aspects, the CSI-RS EPRE and a power offset (e.g., represented by IE powerControlOffset) and the CSI-RS power offset (e.g., represented by an IE powerControlOffsetSS) may be configured for each carrier.

For carriers in inter-band CA, the SSB transmit power (which may be indicated by the IE ss-PBCH-BlockPower) may be indicated to the UE, which may be used as a reference transmit power for the UE to derive (e.g., compute) CSI-RS transmit power for CSI-RS transmission in the carrier. In addition, the CSI-RS transmit power may be used to (e.g., compute) PDSCH transmit power for a PDSCH transmission in the carrier. CSI-RS may be used for various purposes such as a time-frequency tracking function based on a tracking reference signal (TRS), a CSI measurement (such as a radio signal received power (RSRP) measurement, a radio signal received quality (RSRQ) measurement, a received signal strength indicator (RSSI) measurement, a signal-to-interference plus noise ratio (SINR) measurement, or the like), a beam management measurement, or the like.

Figure 5:
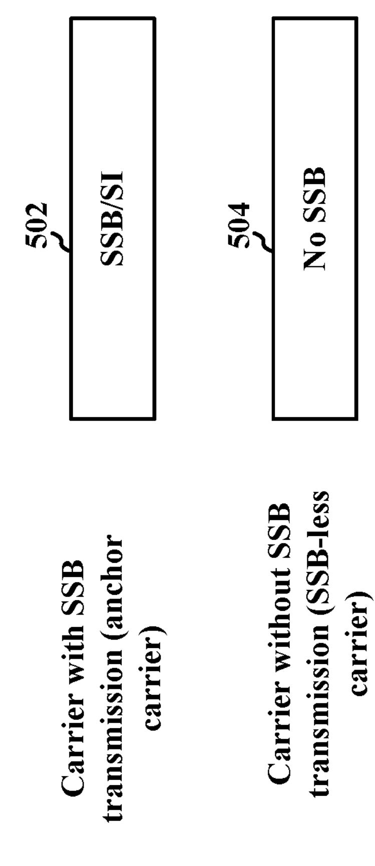
FIG. 5 is a diagram illustrating an example with carriers without synchronization signal block (SSB) transmission and carrier with SSB transmission, in accordance with various aspects of the present disclosure.
Figure 5:

FIG. 5 is a diagram 500 illustrating an example including carriers without an SSB transmission (e.g., SSB-less carriers) and a carrier with an SSB transmission associated with a special cell (SpCell, which may be the primary cell or a primary secondary cell) (a carrier with an SSB transmission associated with a special cell may be referred to as an “anchor carrier”). An SSB transmission is described in connection with FIG. 2B. As illustrated in FIG. 5, a carrier with an SSB transmission (e.g., an anchor carrier) 502 may be associated with an SSB and system information (SI). A carrier without an SSB transmission (e.g., an SSB-less carrier) 504 may be associated with the carrier with the SSB transmission (e.g., an anchor carrier) 502. As described herein, in some aspects, the carrier with the SSB transmission (e.g., an anchor carrier) 502 may provide time or frequency (T/F) synchronization and SI for the carrier without an SSB transmission (e.g., an SSB-less carrier) 504.

In some aspects, the SSB from PCell, PSCell, or SCell associated with the carrier with the SSB transmission (e.g., an anchor carrier) 502 may be used for synchronization, DL automatic gain control (AGC), or layer 1 (L1), layer 2 (L2), or layer 3 (L3) measurement on the SCell associated with the carrier without an SSB transmission (e.g., an SSB-less carrier) 504. In wireless communication systems, the received signal may have an unpredictable signal power and varies over a wide dynamic range caused by multi-path fading channel and unwanted signals such as strong interferer signal. AGC may be a procedure for reducing unwanted signals and dynamically adjusting the AGC gain of the incoming signal to prevent the quantization error or saturation at the analog-to-digital converter (ADC) of the UE. Based on AGC, the received signal strength at the input of the ADCs may be boosted or reduced. In some aspects, the SCell associated with the carrier without an SSB transmission (e.g., an SSB-less carrier) 504 may be activated for communication via the SCell.

Figures 6A, 6B:
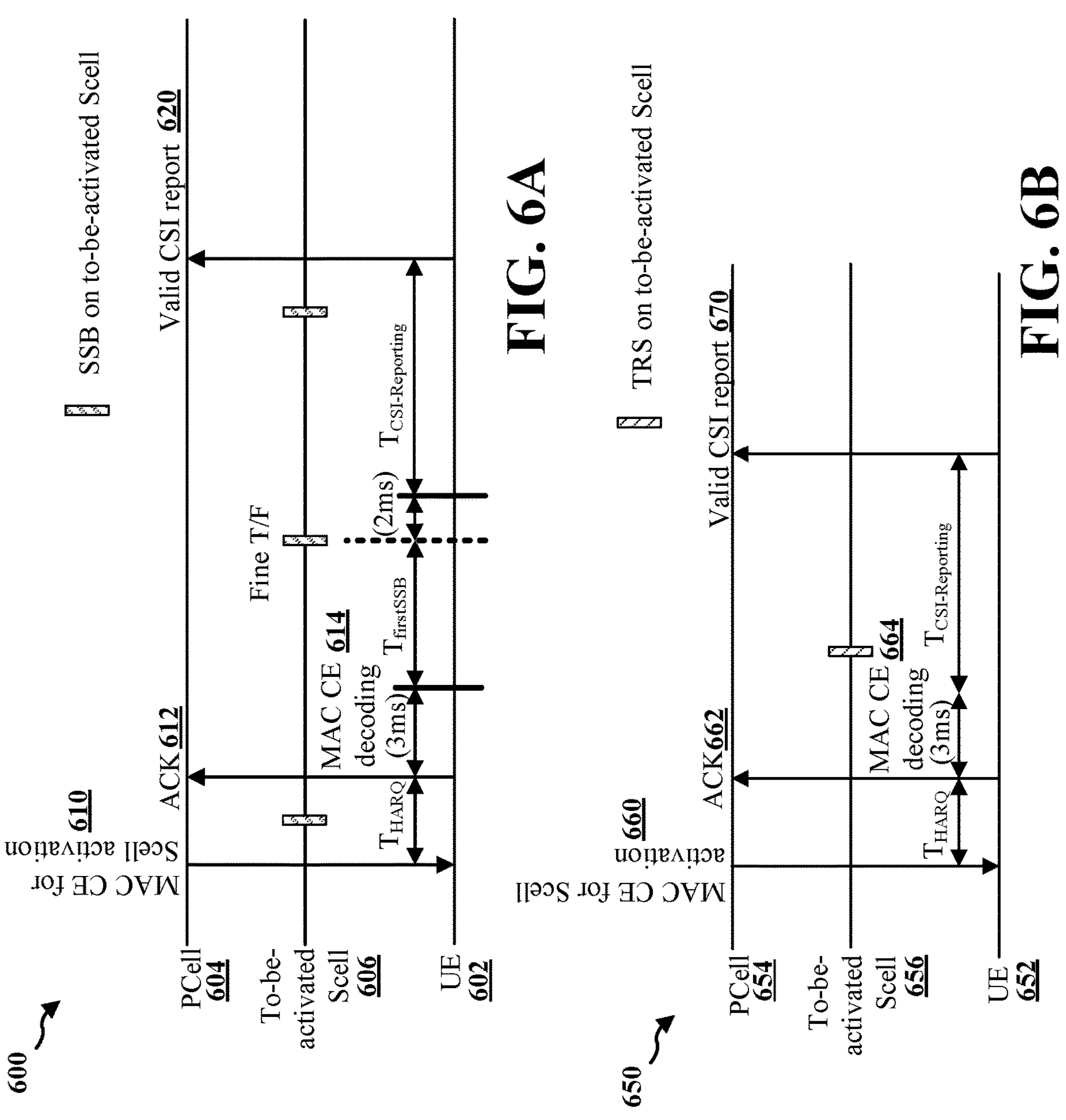
FIG. 6A is a diagram illustrating an example of SSB-based secondary cell (SCell) activation, in accordance with various aspects of the present disclosure.
FIG. 6B is a diagram illustrating an example of SSBless SCell activation with contiguous intra-band CA, in accordance with various aspects of the present disclosure.

FIG. 6A is a diagram 600 illustrating an example of SSB-based SCell activation. As illustrated in FIG. 6A, the UE 602 may receive MAC control element (MAC CE) for SCell activation 610 via the PCell 604 to activate an to-be-activated SCell 606. After receiving the MAC CE for SCell activation 610 via the PCell 604, the UE 602 may transmit an ACK 612 to the PCell 604. A time between the ACK 612 and the MAC CE for SCell activation 610 may be represented by THARQ. During the time between the ACK 612 and the MAC CE for SCell activation 610, an SSB for the SCell 606 may be transmitted. After transmitting the ACK 612, the UE 602 may decode (at 614) the MAC CE for SCell activation 610 (which may take, by way of example, a MAC CE decoding time of 3 ms). SCell activation delay for a known FR1 SCell (e.g., known to the UE 602), such as the SCell 606, may be based on a measurement cycle (e.g., represented by IE MeasCycle) associated with the PCell 604. As an example, one SSB may be used for fine T/F tracking for a MeasCycle<=2400 ms. The SCell activation delay represented by T_activation may be equal to 5 ms+$T_{firstSSB}$ (time between ACK and fine T/F). As an example, one SSB may be used for fine T/F tracking for a MeasCycle>2400 ms. In such an example, the SCell activation delay represented by T_activation may be equal to 5 ms+$T_{firstSSB}$ (time between ACK and fine T/F)+$T_{rs}$ (e.g., a SS/PBCH block measurement timing configuration (SMTC) period of the target cell or a target cell SSB transmission period associated with the SCell 606). After the fine tuning and after a CSI-reporting delay represented by $T_{CSI\text{-}Reporting}$, the UE 602 may transmit a valid CSI report 620 to the PCell 604.

FIG. 6B is a diagram 650 illustrating an example of SSBless SCell activation with active serving cell in intra-band contiguous CA. As illustrated in FIG. 6B, the UE 652 may receive MAC CE for SCell activation 660 via the PCell 654 to activate an to-be-activated SCell 656. After receiving the MAC CE for SCell activation 660 via the PCell 654, the UE 652 may transmit an ACK 662 to the PCell 654. A time between the ACK 662 and the MAC CE for SCell activation 660 may be represented by THARQ. After transmitting the ACK 662, the UE 652 may decode (at 664) the MAC CE for SCell activation 660 (which may take, by way of example, a MAC CE decoding time of 3 ms). In some aspects, the SCell 656 may be an SSB-less SCell. For UE supporting ScellwithoutSSB (SSB-less SCell), such as the UE 652, the UE may not perform time/frequency tracking based on the following assumptions: 1) round trip delay (RTD) between the target SCell (e.g., SCell 656) and contiguous active serving cell (e.g., PCell 654) is within a threshold (e.g., +−260 nanoseconds (ns)), and 2) difference of the reception power between the target SCell (e.g., SCell 656) and the contiguous active serving cell (e.g., PCell 654) is within a threshold (e.g., 6 decibels (dB)), and 3) the RS of the SCell being activated is QCL-type A with TRS of the Scell being activated. A tracking reference signal (TRS) may be received for the SSB-less SCell 656. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam). A UE may assume that the antenna ports of one DM-RS port group of a PDSCH are spatially quasi-co-located (QCLed) with an SSB. After decoding the MAC CE and after a CSI-reporting delay represented by $T_{CSI\text{-}Reporting}$, the UE 652 may transmit a valid CSI report 670 to the PCell 654.

A UE may perform beam failure detection (BFD). For example, a UE may be able to evaluate whether the downlink radio link quality on the configured SSB resource in a set (e.g., failure detection resource set q0) estimated over the last period. When no RLM RS resources are configured then, the UE may monitor the current SSB for the downlink radio link quality. RLM may be a procedure of monitoring the DL link quality based on the RLM RS to measure the DL radio quality for a serving cell. PHY layer, MAC layer, and RRC layers at the UE may be involved in RLM. RLM RS resources may be based on SS/PBCH blocks (SSB), CSI-RS, or combination of SSB and CSI-RS.

BFD may be a combined L1 and L2 procedure where L1 provides the MAC layer indications of beam failure instances (BFIs), the MAC layer may count the indications and declares failure when configured maximum number of BFI indications has been reached. For example, whenever the PHY layer detects that a metric (e.g., the RSRP) of the RS of the serving beam (spatial filter) falls below the threshold, (e.g., 10% block error rate of a hypothetical PDCCH, the PHY layer may trigger a BFI and sends the BFI to MAC layer).

In some examples, the UE may assess the downlink radio link quality of a serving cell based on the reference signal in the set q0 in order to detect beam failure on: 1) PCell in standalone (SA), NR-DC (dual connection of 5G NR and 4G wireless network where master node is a 5G NR gNB and secondary node is also a 5G gNB), or NE-DC (dual connection of 5G NR and 4G wireless network where master node is a 5G NR gNB and secondary node is a 4G eNB), 2) PSCell (primary secondary cell) in NR-DC and EN-DC dual connection of 5G NR and 4G wireless network where secondary node is a 5G NR gNB and master node is a 4G eNB) operation mode, 3) SCell in SA, NR-DC, NE-DC, or EN-DC operation mode, or 4) deactivated PSCell in NR-DC and EN-DC operation mode). For SSBless SCell with inter-band CA, similar assumption may be used. However, if network provide indication for power offset between anchor and non-anchor carrier, it may be useful for UE to perform AGC, measure DMRS power level, and RLM/BFD. For SSB-less SCells associated with non-anchor carrier, when RLM-RS or BFD-RS are not configured, a UE cannot perform radio link monitoring or beam failure detection because there is no SSB to evaluate the downlink radio link quality on non-anchor carrier. A UE may perform AGC for SSBless inter-band CA by assuming a receiving power difference within 6 dB. However, it may be unknown whether the network applies similar transmission powers between anchor carrier associated with the SpCell and the non-anchor carrier associated with an SSB-less SCell. Aspects provided herein may enable a UE to perform beam failure detection or radio link monitoring on SSB-less SCells associated with the non-anchor carrier by indicating a transmit power difference between an SpCell and SSB-less SCells. PDCCH transmission parameters for SSB-based beam failure instances may be enabled based on aspects provided herein if the network indicates a power difference based on aspects provided herein.

Figures 7A, 7B:
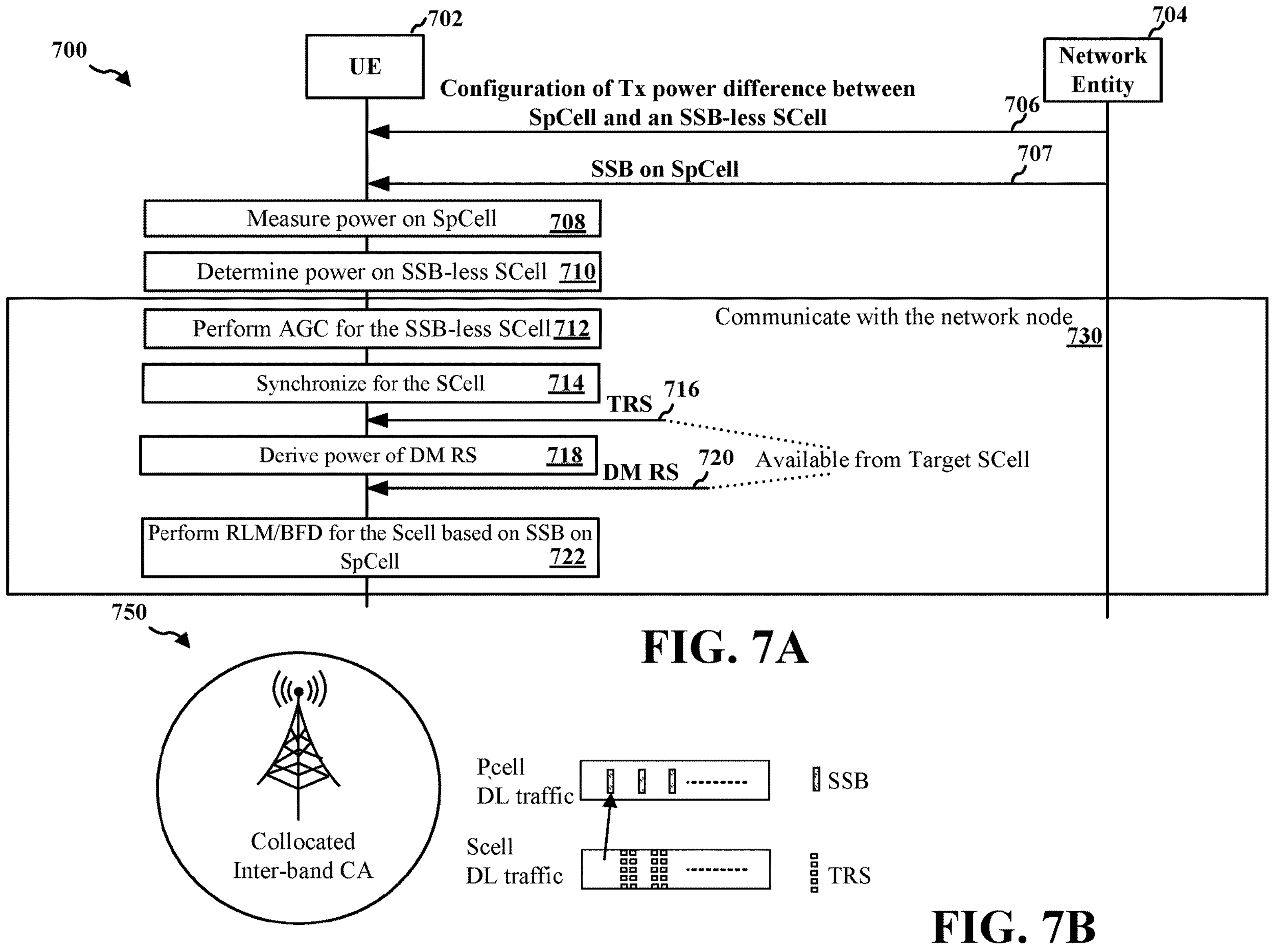
FIG. 7A is a diagram illustrating example communications between a network entity and a UE, in accordance with various aspects of the present disclosure.
FIG. 7B is a diagram illustrating example DL traffic on primary cell (PCell) and SCell.

FIG. 7A is a diagram 700 illustrating example communications between a network entity 704 and a UE 702. The network entity 704 may be a network node. A network node may be implemented as an aggregated base station, a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. The network entity 704 may be associated with a SpCell and an SSB-less SCell. In some aspects, the SSB-less SCell may not have RLM reference signal configuration or a beam failure detection signal configuration for the UE 702 (e.g., RLM or BFD on the SSB-less SCell may be accordingly based on the SSB on the SpCell). As illustrated in FIG. 7A, the network entity 704 may transmit a configuration 706 of transmit power difference between SpCell and the SSB-less SCell, such as a configuration including a powerControlOffsetSS, to the UE 702. In some aspects, the network entity 704 may also transmit SSB 707 on the SpCell. In some aspects, the UE 702 may measure a power on the SpCell at 708. Based on the measured power on the SpCell at 708 and the configuration 706 of transmit power difference between SpCell and the SSB-less SCell, such as a configuration including powerControlOffsetSS, the UE may determine transmit power difference between the SpCell and the SSB-less SCell (e.g., and determine or estimate transmit power on the SSB-less SCell) at 710. In some aspects, the configuration 706 of transmit power difference between SpCell and the SSB-less SCell may be a signaling that indicates transmit power offset between anchor carrier and non-anchor carrier instead of powerControlOffsetSS.

In some aspects, based on the determined transmit power difference or power on the SSB-less SCell (e.g., determined at 710), the UE 702 may communicate with the network entity 704 at 730. In some aspects, the SpCell and the SSB-less SCell associated with the network entity 704 may be collocated and may be inter-band CA (e.g., the SpCell and the SSB-less SCell are on a different frequency band). In some aspects, the UE 702 may estimate power level of the SSB-less SCell (e.g., at 710) for performing AGC at 712. In some aspects, the UE 702 may estimate a power level of the SSB-less SCell (e.g., at 710) for performing AGC at 712 based on the condition that the reception power of the SSB-less SCell with the SpCell is less than 6 dB plus the power offset (e.g., the transmit power difference).

In some aspects, at 714, the UE 702 may synchronize for the SSB-less SCell based on the SSB 707 on the SpCell and based on the determined power difference. In some aspects, hypothetical PDCCH and PDCCH DM RS energy of the SSB-less SCell's Tx power may be different from the reference cell (e.g., the SpCell). In some aspects, DM RS power level of SSB-less SCell may be derived (e.g., at 718)

with respect to TRS 716 power on the SSB-less SCell, which may be determined at 710 based on the SSB power level of the SSB 707 and power difference indicated in the configuration 706. The TRS 716 may be a TRS available to the UE 702 from the target SCell. The UE 702 may also receive the DM RS 720 or receive a PDCCH based on the derived power. The DM RS 720 may be a DM RS available to the UE 702 from the target SCell. In some aspect, based on deriving PDCCH and PDCCH DM RS energy (e.g., based on the DM RS power level of SSB-less SCell), the UE may perform RLM or BFD for the SCell based on SSB 707 on the SpCell at 722. In other words, RLM/BFD for SSB-less carrier may be performed based on the reference SSB power with a Tx power offset (e.g., indicated by the configuration 706).

FIG. 7B is a diagram 750 illustrating example DL traffic on a PCell and an SCell. The PCell and the SCell may be configured for the UE for collocated inter-band CA. An SCell BFD-RS may be the PCell SSB (e.g., the UE may use the PCell SSB as a BFD-RS for the SCell). An SCell BFD-RS power may be a derived PCell SSB power plus a power offset (e.g., PowerOffset) (e.g., based on the transmit power difference indicated by the configuration 706). The SCell DM RS power may be derived with regard to a TRS, which may be based on an SSB derived Pcell SSB power plus a power offset (e.g. PowerOffset) (e.g., based on the transmit power difference indicated by the configuration 706). In some aspects, an example of PDCCH transmission parameters for beam failure instance is provided in the table below:

TABLE 2

| Attribute | Value for BLER |
|---|---|
| DCI format | 1-0 |
| Number of control OFDM symbols | 2 |
| Aggregation level (CCE) | 8 |
| Ratio of hypothetical PDCCH RE energy to average SSS RE energy | 0 + X dB, where X may be based on the power offset (Tx power difference) based on configuration 706 |
| Ratio of hypothetical PDCCH DMRS energy to average SSS RE energy | 0 + X dB, where X may be based on the power offset (Tx power difference) based on configuration 706 |
| Bandwidth (PRBs) | 24 |
| Sub-carrier spacing (kHz) | Same as the SCS of remaining minimum system information (RMSI) CORESET |
| DM RS precoder granularity | REG bundle size |
| Resource element group (REG) bundle size | 6 |
| CP length | Normal |
| Mapping from REG to CCE | Distributed |

Figure 8:
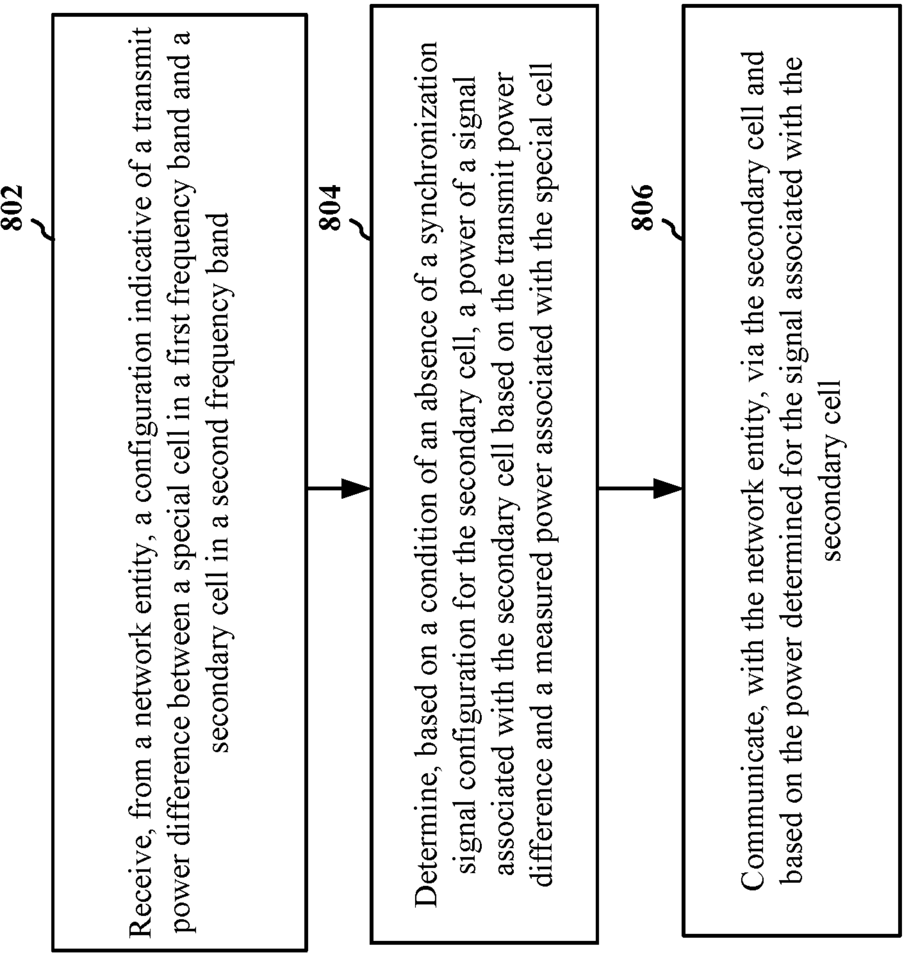
FIG. 8 is a flowchart of a method of wireless communication, in accordance with various aspects of the present disclosure.

FIG. 8 is a flowchart 800 of a method of wireless communication. The method may be performed by a UE (e.g., the UE 104, the UE 702; the apparatus 1004). The method enables the UE to perform beam failure detection on SSB-less SCells associated with non-anchor carrier by indicating a transmit power difference between a SpCell and SSB-less SCells.

At 802, the UE may receive, from a network entity, a configuration indicative of a transmit power difference between a special cell in a first frequency band and a secondary cell without an SSB in a second frequency band. For example, the UE 702 may receive, from a network entity (e.g., 704), a configuration (e.g., 706) indicative of a transmit power difference between a special cell in a first frequency band and a secondary cell without an SSB in a second frequency band. In some aspects, 802 may be performed by CA component 198.

At 804, the UE may determine, based on a condition of an absence of a synchronization signal configuration for the secondary cell, a power of a signal associated with the secondary cell based on the transmit power difference and a measured power associated with the special cell. For example, the UE 702 may determine (e.g., 710), based on a condition of an absence of a synchronization signal configuration for the secondary cell, a power of a signal associated with the secondary cell based on the transmit power difference and a measured power (e.g., measured at 708) associated with the special cell. In some aspects, 804 may be performed by CA component 198.

At 806, the UE may communicate, with the network entity, via the secondary cell and based on the power determined for the signal associated with the secondary cell. For example, the UE 702 may communicate (e.g., at 730), with the network entity 704, via the secondary cell and based on the power determined for the signal associated with the secondary cell. In some aspects, 806 may be performed by CA component 198.

Figure 9:
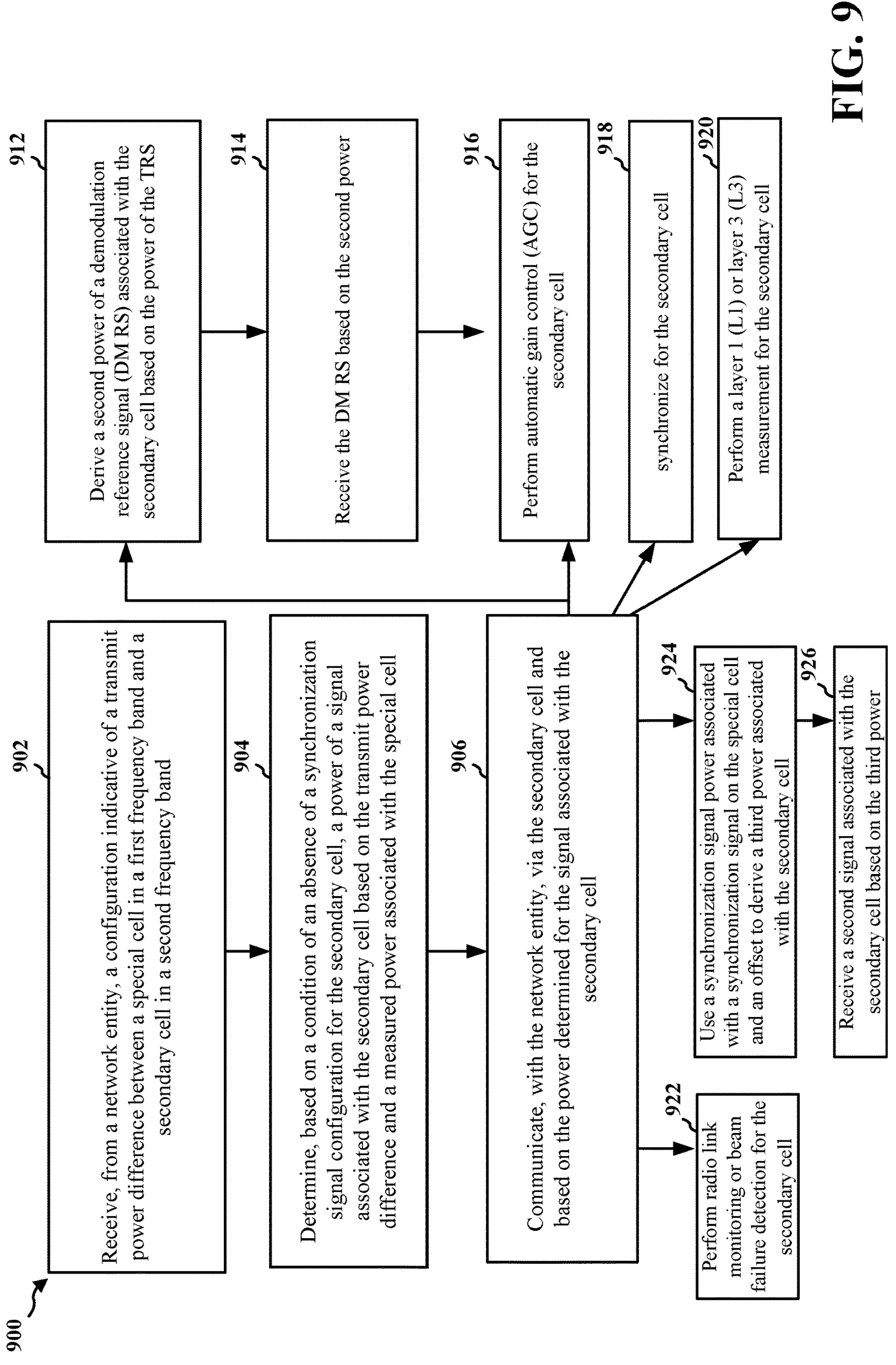
FIG. 9 is a flowchart of a method of wireless communication, in accordance with various aspects of the present disclosure.

FIG. 9 is a flowchart 900 of a method of wireless communication. The method may be performed by a UE (e.g., the UE 104, the UE 702; the apparatus 1004).

At 902, the UE may receive, from a network entity, a configuration indicative of a transmit power difference between a special cell in a first frequency band and a secondary cell without an SSB in a second frequency band. For example, the UE 702 may receive, from a network entity (e.g., 704), a configuration (e.g., 706) indicative of a transmit power difference between a special cell in a first frequency band and a secondary cell without an SSB in a second frequency band. In some aspects, 902 may be performed by CA component 198. In some aspects, the special cell is a PCell. In some aspects, the special cell is a primary secondary cell. In some aspects, the first frequency band includes an anchor carrier, and the second frequency band includes a non-anchor carrier.

At 904, the UE may determine, based on a condition of an absence of a synchronization signal configuration for the secondary cell, a power of a signal associated with the secondary cell based on the transmit power difference and a measured power associated with the special cell. For example, the UE 702 may determine (e.g., 710), based on a condition of an absence of a synchronization signal configuration for the secondary cell, a power of a signal associated with the secondary cell based on the transmit power difference and a measured power (e.g., measured at 708) associated with the special cell. In some aspects, 904 may be performed by CA component 198.

At 906, the UE may communicate, with the network entity, via the secondary cell and based on the power determined for the signal associated with the secondary cell. For example, the UE 702 may communicate (e.g., at 730), with the network entity 704, via the secondary cell and based on the power determined for the signal associated with the secondary cell. In some aspects, 906 may be performed by CA component 198. In some aspects, the configuration indicative of the transmit power difference indicates an offset of CSI-RS transmission power relative to a SS/PBCH for the special cell, the power determined for the signal associated with the secondary cell being based on the offset, the measured power associated with the special cell being associated with the SS/PBCH for the special cell. In some aspects, the configuration includes a value of a transmission power offset between a first carrier for the special cell and a second carrier for the secondary cell.

At 912, the UE may derive a second power of a DM RS associated with the secondary cell based on the power of the TRS. For example, the UE 702 may derive (e.g., at 718) a second power of a DM RS associated with the secondary cell based on the power of the TRS. In some aspects, 912 may be performed by CA component 198.

At 914, the UE may receive the DM RS based on the second power. For example, the UE 702 may receive the DM RS 720 based on the second power. In some aspects, 914 may be performed by CA component 198.

In some aspects, the signal includes a TRS, and where to communicate with the network entity. At 916, the UE may perform AGC for the secondary cell. For example, the UE 702 may perform AGC for the secondary cell (e.g., at 712). In some aspects, 916 may be performed by CA component 198.

At 918, the UE may synchronize for the secondary cell. For example, the UE 702 may synchronize for the secondary cell (e.g., at 714). In some aspects, 918 may be performed by CA component 198.

At 920, the UE may perform a layer 1 (L1) or layer 3 (L3) measurement for the secondary cell. For example, the UE 702 may perform a layer 1 (L1) or layer 3 (L3) measurement for the secondary cell. In some aspects, 920 may be performed by CA component 198. In some aspects, the signal is a PDCCH or a PDCCH DM RS.

In some aspects, the condition is further based on an additional absence of a RLM reference signal configuration or a beam failure detection signal configuration. At 922, the UE may perform radio link monitoring or beam failure detection for the secondary cell. For example, the UE 702 may perform (e.g., at 722) radio link monitoring or beam failure detection for the secondary cell. In some aspects, 922 may be performed by CA component 198.

At 924, the UE may use a synchronization signal power associated with a synchronization signal on the special cell and an offset to derive a third power associated with the secondary cell. For example, the UE 702 may use a synchronization signal power associated with a synchronization signal on the special cell and an offset to derive (e.g., at 718) a third power associated with the secondary cell. In some aspects, the synchronization signal on the special cell is associated with a RLM or a beam failure detection on the secondary cell. In some aspects, 924 may be performed by CA component 198.

At 926, the UE may receive a second signal associated with the secondary cell based on the third power. For example, the UE 702 may receive a second signal (e.g., PDCCH, PDCCH DM RS, or a different signal) associated with the secondary cell based on the third power. In some aspects, 926 may be performed by CA component 198.

Figure 10:
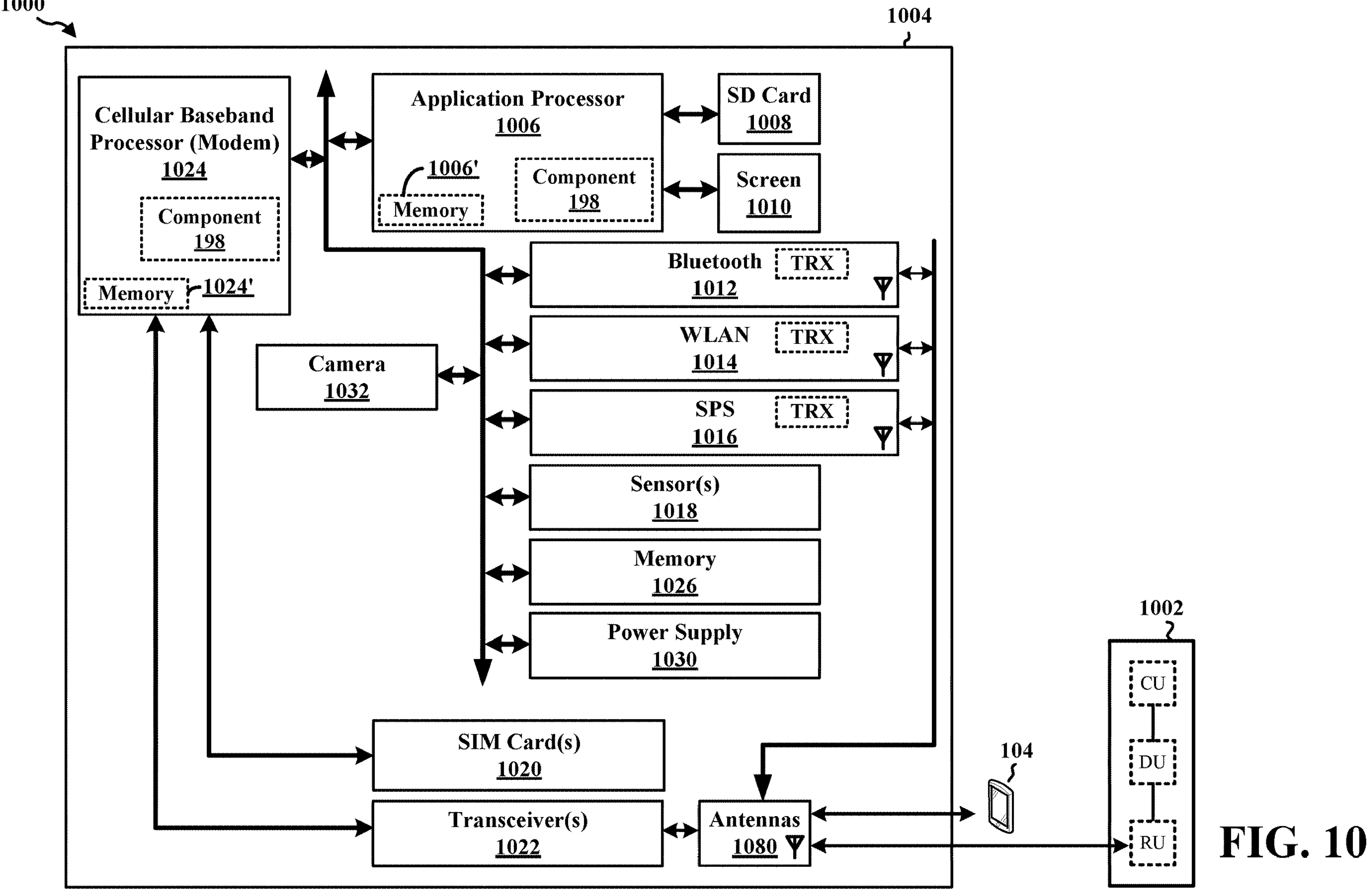
FIG. 10 is a diagram illustrating an example of a hardware implementation for an example apparatus and/or UE, in accordance with various aspects of the present disclosure.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, a satellite system module 1016 (e.g., GNSS module), one or more sensor modules 1018 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the satellite system module 1016 may include an on-chip transceiver (TRX)/receiver (RX). The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described herein. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see 350 of FIG. 3) and include the additional modules of the apparatus 1004.

As discussed herein, the CA component 198 may be configured to receive, from a network entity, a configuration indicative of a transmit power difference between a special cell in a first frequency band and a secondary cell without an SSB in a second frequency band. In some aspects, the CA component 198 may be further configured to determine, based on a condition of an absence of a synchronization signal configuration for the secondary cell, a power of a signal associated with the secondary cell based on the transmit power difference and a measured power associated with the special cell. In some aspects, the CA component 198 may be further configured to communicate, with the network entity, via the secondary cell and based on the power determined for the signal associated with the secondary cell. The CA component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for receiving, from a network entity, a configuration indicative of a transmit power difference between a special cell in a first frequency band and a secondary cell without an SSB in a second frequency band. In some aspects, the apparatus 1004 may further include means for determining, based on a condition of an absence of a synchronization signal configuration for the secondary cell, a power of a signal associated with the secondary cell based on the transmit power difference and a measured power associated with the special cell. In some aspects, the apparatus 1004 may further include means for communicating, with the network entity, via the secondary cell and based on the power determined for the signal associated with the secondary cell. In some aspects, the apparatus 1004 may further include means for performing automatic gain control (AGC) for the secondary cell. In some aspects, the apparatus 1004 may further include means for synchronizing for the secondary cell. In some aspects, the apparatus 1004 may further include means for performing a layer 1 (L1) or layer 3 (L3) measurement for the secondary cell. In some aspects, the apparatus 1004 may further include means for deriving a second power of a demodulation reference signal (DM RS) associated with the secondary cell based on the power of the TRS. In some aspects, the apparatus 1004 may further include means for receiving the DM RS based on the second power. In some aspects, the apparatus 1004 may further include means for performing radio link monitoring or beam failure detection for the secondary cell. In some aspects, the apparatus 1004 may further include means for using a synchronization signal power associated with a synchronization signal on the special cell and an offset to derive a third power associated with the secondary cell, and where the synchronization signal on the special cell is associated with a RLM or a beam failure detection on the secondary cell. In some aspects, the apparatus 1004 may further include means for receiving a second signal associated with the secondary cell based on the third power. The means may be the CA component 198 of the apparatus 1004 configured to perform the functions recited by the means. As described herein, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication at a user equipment (UE), including: receiving, from a network entity, a configuration indicative of a transmit power difference between a special cell in a first frequency band and a secondary cell without an SSB in a second frequency band; determining, based on a condition of an absence of a synchronization signal configuration for the secondary cell, a power of a signal associated with the secondary cell based on the transmit power difference and a measured power associated with the special cell; and communicating, with the network entity, via the secondary cell and based on the power determined for the signal associated with the secondary cell.

Aspect 2 is the method of aspect 1, where the configuration indicative of the transmit power difference indicates an offset of channel state information reference signal (CSI-RS) transmission power relative to a synchronization signal physical broadcast channel (SS/PBCH) for the special cell, the power determined for the signal associated with the secondary cell being based on the offset, the measured power associated with the special cell being associated with the SS/PBCH for the special cell.

Aspect 3 is the method of any of aspects 1-2, where the configuration includes a value of a transmission power offset between a first carrier for the special cell and a second carrier for the secondary cell.

Aspect 4 is the method of any of aspects 1-3, where the signal includes a tracking reference signal (TRS), and where to communicate with the network entity, and further including: performing automatic gain control (AGC) for the secondary cell.

Aspect 5 is the method of any of aspects 1-4, where communicating with the network entity further includes: synchronizing for the secondary cell.

Aspect 6 is the method of any of aspects 1-5, where communicating with the network entity further includes: performing a layer 1 (L1) or layer 3 (L3) measurement for the secondary cell.

Aspect 7 is the method of any of aspects 1-6, where the configuration indicative of the transmit power difference indicates an offset of channel state information reference signal (CSI-RS) transmission power relative to a synchronization signal physical broadcast channel (SS/PBCH) for the special cell, the power determined for the signal associated with the secondary cell being based on the offset, the measured power associated with the special cell being associated with the SS/PBCH for the special cell, where the signal is a tracking reference signal (TRS), and further including: deriving a second power of a demodulation reference signal (DM RS) associated with the secondary cell based on the power of the TRS; and receiving the DM RS based on the second power.

Aspect 8 is the method of any of aspects 1-6, where the signal is a physical downlink control channel (PDCCH) or a PDCCH demodulation reference signal (DM RS).

Aspect 9 is the method of any of aspects 1-8, where the condition is further based on an additional absence of a radio link monitoring (RLM) reference signal configuration or a beam failure detection signal configuration, and where communicating with the network entity further includes: performing radio link monitoring or beam failure detection for the secondary cell.

Aspect 10 is the method of any of aspects 1-9, further including: using a synchronization signal power associated with a synchronization signal on the special cell and an offset to derive a third power associated with the secondary cell, and where the synchronization signal on the special cell is associated with a RLM or a beam failure detection on the secondary cell; and receiving a second signal associated with the secondary cell based on the third power.

Aspect 11 is the method of any of aspects 1-10, where the special cell is a primary cell (PCell).

Aspect 12 is the method of any of aspects 1-10, where the special cell is a primary secondary cell.

Aspect 13 is the method of any of aspects 1-12, where the first frequency band includes an anchor carrier, and the second frequency band includes a non-anchor carrier.

Aspect 14 is an apparatus for wireless communication at a device including at least one memory and at least one processor coupled to the at least one memory and, based at least in part on information stored in the at least one memory, the at least one processor is configured to implement any of aspects 1 to 13.

Aspect 15 is the apparatus of aspect 14, further including a transceiver or an antenna coupled to the at least one processor.

Aspect 16 is an apparatus for wireless communication at a device including means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

What is claimed is:

1. An apparatus for wireless communication at a user equipment (UE), comprising:

at least one memory; and at least one processor coupled to the at least one memory and, based at least in part on stored information that is stored in the at least one memory, the at least one processor is configured to cause the apparatus to:

receive, from a network entity, a configuration indicative of a transmit power difference between a special cell in a first frequency band and a secondary cell without a synchronization signal block (SSB) in a second frequency band;

determine, based on a condition of an absence of a synchronization signal configuration for the secondary cell, a power of a signal associated with the secondary cell based on the transmit power difference and a measured power associated with the special cell; and communicate, with the network entity, via the secondary cell and based on the power determined for the signal associated with the secondary cell.

2. The apparatus of claim 1, wherein the configuration indicative of the transmit power difference indicates an offset of channel state information reference signal (CSI-RS) transmission power for the secondary cell without the SSB relative to a synchronization signal physical broadcast channel (SS/PBCH) for the special cell, the power determined for the signal associated with the secondary cell being based on the offset, the measured power associated with the special cell being associated with the SS/PBCH for the special cell.

3. The apparatus of claim 1, wherein the configuration comprises a value of a transmission power offset between a first carrier for the special cell and a second carrier for the secondary cell without the SSB.

4. The apparatus of claim 1, wherein the signal comprises a tracking reference signal (TRS), and wherein to communicate with the network entity, the at least one processor is further configured to cause the apparatus to:

perform automatic gain control (AGC) for the secondary cell.

5. The apparatus of claim 1, wherein to communicate with the network entity, the at least one processor is further configured to cause the apparatus to:

synchronize for the secondary cell.

6. The apparatus of claim 1, wherein to communicate with the network entity, the at least one processor is further configured to cause the apparatus to perform a layer 1 (L1) or layer 3 (L3) measurement for the secondary cell.

7. The apparatus of claim 1, wherein the configuration indicative of the transmit power difference indicates an offset of channel state information reference signal (CSI-RS) transmission power for the secondary cell without the SSB relative to a synchronization signal physical broadcast channel (SS/PBCH) for the special cell, the power determined for the signal associated with the secondary cell being based on the offset, the measured power associated with the special cell being associated with the SS/PBCH for the special cell, wherein the signal is a tracking reference signal (TRS), and wherein the at least one processor is further configured to cause the apparatus to:

derive a second power of a demodulation reference signal (DM RS) associated with the secondary cell based on the power of the TRS; and receive the DM RS based on the second power.

8. The apparatus of claim 1, wherein the signal is a physical downlink control channel (PDCCH) or a PDCCH demodulation reference signal (DM RS).

9. The apparatus of claim 1, wherein the condition is further based on an additional absence of a radio link monitoring (RLM) reference signal configuration or a beam failure detection signal configuration, wherein to communicate with the network entity, the at least one processor is further configured to cause the apparatus to:

perform radio link monitoring or beam failure detection for the secondary cell without the SSB.

10. The apparatus of claim 9, wherein the at least one processor is further configured to cause the apparatus to:

use a synchronization signal power associated with a synchronization signal on the special cell and an offset to derive a third power associated with the secondary cell, and wherein the synchronization signal on the special cell is associated with a RLM or a beam failure detection on the secondary cell without the SSB; and receive a second signal associated with the secondary cell based on the third power.

11. The apparatus of claim 1, wherein the special cell is a primary cell (PCell).

12. The apparatus of claim 1, wherein the special cell is a primary secondary cell.

13. The apparatus of claim 1, wherein the first frequency band comprises an anchor carrier, and the second frequency band comprises a non-anchor carrier.

14. A method for wireless communication at a user equipment (UE), comprising:

receiving, from a network entity, a configuration indicative of a transmit power difference between a special cell in a first frequency band and a secondary cell without a synchronization signal block (SSB) in a second frequency band;

determining, based on a condition of an absence of a synchronization signal configuration for the secondary cell, a power of a signal associated with the secondary cell based on the transmit power difference and a measured power associated with the special cell; and communicating, with the network entity, via the secondary cell and based on the power determined for the signal associated with the secondary cell.

15. The method of claim 14, wherein the configuration indicative of the transmit power difference indicates an offset of channel state information reference signal (CSI-RS) transmission power for the secondary cell without the SSB relative to a synchronization signal physical broadcast channel (SS/PBCH) for the special cell, the power determined for the signal associated with the secondary cell being based on the offset, the measured power associated with the special cell being associated with the SS/PBCH for the special cell.

16. The method of claim 14, wherein the configuration comprises a value of a transmission power offset between a first carrier for the special cell and a second carrier for the secondary cell.

17. The method of claim 14, wherein the signal comprises a tracking reference signal (TRS), and wherein to communicate with the network entity, and further comprising:

performing automatic gain control (AGC) for the secondary cell.

18. The method of claim 14, wherein communicating with the network entity further comprises:

synchronizing for the secondary cell.

19. The method of claim 14, wherein communicating with the network entity further comprises:

performing a layer 1 (L1) or layer 3 (L3) measurement for the secondary cell.

20. The method of claim 14, wherein the configuration indicative of the transmit power difference indicates an offset of channel state information reference signal (CSI-RS) transmission power relative to a synchronization signal physical broadcast channel (SS/PBCH) for the special cell, the power determined for the signal associated with the secondary cell being based on the offset, the measured power associated with the special cell being associated with the SS/PBCH for the special cell, wherein the signal is a tracking reference signal (TRS), and further comprising:

deriving a second power of a demodulation reference signal (DM RS) associated with the secondary cell based on the power of the TRS; and receiving the DM RS based on the second power.

21. The method of claim 14, wherein the signal is a physical downlink control channel (PDCCH) or a PDCCH demodulation reference signal (DM RS).

22. The method of claim 14, wherein the condition is further based on an additional absence of a radio link monitoring (RLM) reference signal configuration or a beam failure detection signal configuration, and wherein communicating with the network entity further comprises:

performing radio link monitoring or beam failure detection for the secondary cell.

23. The method of claim 14, further comprising:

using a synchronization signal power associated with a synchronization signal on the special cell and an offset to derive a third power associated with the secondary cell, and wherein the synchronization signal on the special cell is associated with a RLM or a beam failure detection on the secondary cell; and receiving a second signal associated with the secondary cell based on the third power.

24. The method of claim 14, wherein the special cell is a primary cell (PCell).

25. The method of claim 14, wherein the special cell is a primary secondary cell.

26. The method of claim 14, wherein the first frequency band comprises an anchor carrier, and the second frequency band comprises a non-anchor carrier.

27. An apparatus for wireless communication at a user equipment (UE), comprising:

means for receiving, from a network entity, a configuration indicative of a transmit power difference between a special cell in a first frequency band and a secondary cell without a synchronization signal block (SSB) in a second frequency band;

means for determining, based on a condition of an absence of a synchronization signal configuration for the secondary cell, a power of a signal associated with the secondary cell based on the transmit power difference and a measured power associated with the special cell; and means for communicating, with the network entity, via the secondary cell and based on the power determined for the signal associated with the secondary cell.

28. A non-transitory computer-readable medium storing computer executable code at a user equipment (UE), the code when executed by a processor causes the processor to:

receive, from a network entity, a configuration indicative of a transmit power difference between a special cell in a first frequency band and a secondary cell without a synchronization signal block (SSB) in a second frequency band;

determine, based on a condition of an absence of a synchronization signal configuration for the secondary cell, a power of a signal associated with the secondary cell based on the transmit power difference and a measured power associated with the special cell; and communicate, with the network entity, via the secondary cell and based on the power determined for the signal associated with the secondary cell.

* * * * *